US010891593B2

(12) United States Patent
Brunn et al.

(10) Patent No.: US 10,891,593 B2
(45) Date of Patent: Jan. 12, 2021

(54) MENTIONS WITH AUTOMATED GOAL OPTIMIZATION

(71) Applicant: International Business Machines Corporation, Armonk, NY (US)

(72) Inventors: Jonathan F. Brunn, Logan, UT (US); Rachael M. H. Dickens, Raleigh, NC (US); Scott E. Chapman, Groton, MA (US); Ami H. Dewar, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 16/146,291

(22) Filed: Sep. 28, 2018

(65) Prior Publication Data
US 2020/0104798 A1 Apr. 2, 2020

(51) Int. Cl.
G06Q 10/10 (2012.01)
H04L 12/58 (2006.01)
G06F 9/54 (2006.01)
G06N 7/00 (2006.01)
H04L 12/18 (2006.01)
G06N 20/00 (2019.01)
G06F 16/901 (2019.01)

(52) U.S. Cl.
CPC ........... G06Q 10/107 (2013.01); G06F 9/542 (2013.01); G06F 16/9024 (2019.01); G06N 7/005 (2013.01); G06N 20/00 (2019.01); H04L 12/1831 (2013.01); H04L 51/24 (2013.01); H04L 51/32 (2013.01)

(58) Field of Classification Search
CPC ........ G06N 20/00; G06N 7/005; G06F 9/542; G06F 16/9024; H04L 12/1831; H04L 51/24; H04L 51/32
See application file for complete search history.

(56) References Cited

U.S. PATENT DOCUMENTS

| 9,094,282 B2 | 7/2015 | Richardson et al. |
| 9,563,875 B2 | 2/2017 | Heidloff et al. |
| 2010/0082751 A1* | 4/2010 | Meijer .................... G06F 15/16 709/206 |
| 2014/0280594 A1 | 9/2014 | Everton et al. |
| 2016/0342571 A1* | 11/2016 | Lane ........................ H04W 4/18 |

(Continued)

OTHER PUBLICATIONS

Slack Technologies, Inc. "Getting things done with Reminders", The Official Slack Blog, Apr. 13, 2016, 3 pages. (Year: 2016).*

(Continued)

*Primary Examiner* — George C Neurauter, Jr.
(74) *Attorney, Agent, or Firm* — L. Jeffrey Kelly; Edell, Shapiro & Finnan, LLC (57) ABSTRACT

A method, a computer system, and a computer program product are provided for delivering notifications to users of a messaging platform. A mention directed to a specific context of users is received from a user of a messaging platform. A subset of users is dynamically determined from the specific context of users such that each user of the subset of users is more likely to engage with a notification associated with the mention than users of the specific context of users outside of the subset of users. The notification associated with the mention is sent to only the subset of users from the specific context of users.

17 Claims, 3 Drawing Sheets

(56) References Cited

U.S. PATENT DOCUMENTS

| | | | |
|---|---|---|---|
| 2016/0344679 A1* | 11/2016 | Lane | H04L 51/02 |
| 2016/0344800 A1 | 11/2016 | Emmanuel et al. | |
| 2016/0380978 A1 | 12/2016 | Brunn et al. | |
| 2017/0236081 A1* | 8/2017 | Grady Smith | G06Q 10/067 |
| | | | 705/7.36 |
| 2018/0365626 A1* | 12/2018 | Mansour | G06Q 10/06393 |
| 2018/0365627 A1* | 12/2018 | Mansour | G06Q 10/06393 |

OTHER PUBLICATIONS

Twitter, Inc. "Filtering mentions", Sep. 12, 2013, 1 page. (Year: 2013).*

Skillcrush. "What is the difference between @channel, @here, @all?", publicly posted Oct. 26, 2016, 1 page. (Year: 2016).*

"@Mention People and Groups in Posts and Comments", retrieved on Sep. 28, 2018 from https://help.salesforce.com/articleView?id=collab_add_mentioning_people.htm&type=0, SalesForce.

"Get teammates'attention", retrieved on Sep. 28, 2018 from https://confluence.atlassian.com/hipchat/get-teammates-attention-744328217.html, Atlassian (C) 2018.

"Using Slack: Notify a channel or workspace", retrieved on Sep. 28, 2018 from https://get.slack.help/hc/en-us/articles/202009646-Make-an-announcement, Slack.

Anonymous, Ability to Tage all Members of a team/channel in a message/post, retrieved Sep. 28, 2018, https://microsoftteams.uservoice.com/forums/555103-public/suggestions/16995703-ability-to-tag-allmembers-of-a-team-channel-in-a, pp. 1-5.

Anonymous, How can we improve Discord?, retrieved Sep. 28, 2018, https://feedback.discordapp.com/forums/326712-discord-dreamland/suggestions/10334619-add-mention-a-group-role-e-g-moderator-to-not, pp. 1-5.

Anonymous, Use @mentions to get someone's attention, retrieved Sep. 28, 2018, https://support.office.com/en-us/article/Use-mentions-to-get-someone-s-attention-90701709-5dc1-41c7-aa48-b01d4a46e8c7, pp. 1-5.

Knight, Benjamin, @all feature that lets you @mention all users in a group, 2014, https://www.loomio.org/d/1XaOf5Zn/-all-feature-thatlets-you-mention-all-users-in-a-group, pp. 1-2.

Rsanheim, Introducing Team Mentions, The GitHub Blog, May 9, 2012, https://github.com/blog/1121-introducing-team-mentions, pp. 1-3.

* cited by examiner

MENTIONS WITH AUTOMATED GOAL OPTIMIZATION

BACKGROUND

1. Technical Field

Present invention embodiments relate to a messaging platform in which a notification associated with a posted message is incrementally sent to an increasing subset of users in a specific context using strategies to increase a probability of receiving a successful response. When a notified user provides a sufficient, or successful, response to the posted message, no additional notifications associated with the posted message are sent.

2. Discussion of the Related Art

The term @mention is commonly used to notify people and groups of a message posted on a messaging platform. Generally, typing @username within a message notifies a particular individual and provides the individual with the message. If the particular user is offline, the user may be notified by email, mobile push notifications, or short message service (SMS).

In HipChat® (HipChat is a registered trademark of HipChat, Inc. of Sunnyvale Calif.), typing @here within a message causes a notification regarding the message to be sent to all users who are currently online in a space or a channel. Typing @all within a message causes a notification regarding the message to be sent to all users in a space or channel, whether the users are online or offline.

Slack® (Slack is a registered trademark of Slack Technologies, Inc. of San Francisco, Calif.) uses @everyone or @channel in a same way as @all is used in HipChat®.

Microsoft Teams® (Microsoft Teams is a registered trademark of Microsoft Corp. of Redmond, Wash.) uses @general to notify all users of a team or channel of a posted message.

The various approaches to @mention groups or channels could lead to information overload. This is especially true if @mention is targeted at public groups, very large teams or very large channels where @all or @here could be grossly overused and lead to too many notifications.

Two main reasons why users would @mention a group or a space are:
 1. Distributing information or announcements; and
 2. Seeking help.

In the first case, this could be modeled as channels or topics such that users could direct @group style notifications more directly. Users may tune in or out of these types of notifications based on subscriptions or memberships in these smaller groups that may be used only for notifications.

In the second case, users could create channels for seeking help. In Slack®, a workspace or team may include a @help channel dedicated to asking and answering questions or addressing issues. These channels could still be overused, in which case many users could needlessly receive notifications. These separate channels could lose a context of a request. Even if a help channel and an announcement channel are added to every team, channel, space, group, etc., people who are most knowledgeable and capable to provide help could be the busiest and may not listen to these separate channels.

SUMMARY

According to one embodiment of the present invention, a computer-implemented method is provided for delivering notifications to users of a messaging platform. A server receives a mention, directed to a specific context of users, from a user of a messaging platform. The server dynamically determines a subset of users from the specific context of users such that each user of the subset of users is more likely to engage with a notification associated with the mention than users of the specific context of users outside of the subset of users. The server sends the notification associated with the mention to only the subset of users from the specific context.

According to a second embodiment of the present invention, a computer system is provided for delivering notifications to users of a messaging platform. The computer system includes at least one processor and a memory connected with the at least one processor. The memory includes instructions for the at least one processor to configure the at least one processor to perform a number of steps. According to the steps, a mention directed to a specific context of users is received from a user of a messaging platform. A subset of users from the specific context of users is dynamically determined such that each user of the subset of users is more likely to engage with a notification associated with the mention than users of the specific context outside of the subset of users. The notification associated with the mention is sent to only the subset of users from the specific context.

According to a third embodiment of the present invention, a computer program product is provided. The computer program product includes at least one computer readable storage medium having computer readable program code embodied therewith for execution on at least one processor of a computer device. The computer readable program code is configured to be executed by the at least one processor to perform a number of steps. According to the steps, a mention directed to a specific context of users is received from a user of a messaging platform. A subset of users from the specific context of users is dynamically determined such that each user of the subset of users is more likely to engage with a notification associated with the mention than users of the specific context outside of the subset of users. The notification associated with the mention is sent to only the subset of users from the specific context of users.

BRIEF DESCRIPTION OF THE DRAWINGS

Generally, like reference numerals in the various figures are utilized to designate like components.

DETAILED DESCRIPTION

In various embodiments, a user may post a message including a new type of @mention with respect to a team, a space, a channel or any other group of users of a messaging platform. The embodiments may pursue specific strategies for delivering a notification associated with the posted message to get at least one user deeply engaged, at least to a point such that a conversation regarding the posted message can be closed with a successful resolution or moved to a next stage. When a determination is made that the conversation can be closed or moved to the next stage, no additional notifications associated with the posted message may be sent and, in some embodiments, outstanding notifications associated with the posted message may be withdrawn.

In this specification, this new type of @mention is referred to as @any. However, in other implementations of the various embodiments, this new type of @mention may have different names such as, for example, @anyone, @someone, @atleastl, or other names.

Figure 1:
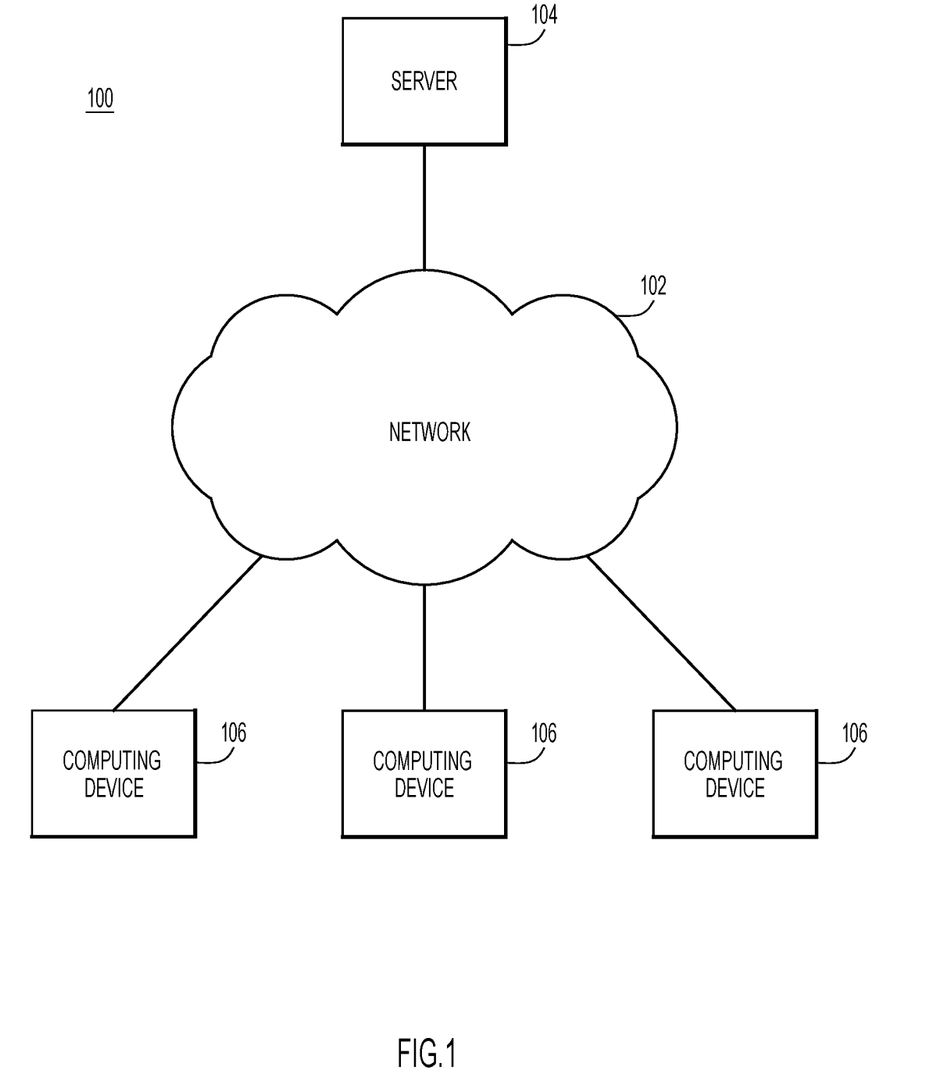
FIG. 1 illustrates an example operating environment according to embodiments of the invention.

An example environment 100 for use with present invention embodiments is illustrated in FIG. 1. Specifically, environment 100 may include one or more computing devices 106, a network 102 and a server 104. Computing devices 106 and server 104 may be remote from each other and may communicate over network 102. Network 102 may be implemented by any number of any suitable communications media, such as a wide area network (WAN), local area network (LAN), Internet, Intranet, etc. Alternatively, computing devices 106 and server 104 may be local to each other, and communicate via any appropriate local communication medium, such as a local area network (LAN), hardwire, wireless link, Intranet, etc. Server 104 may be a single computing device or a server farm including multiple computing devices. Server 104 may execute a messaging platform application for receiving messages from users and delivering messages to users via computing devices 106.

Embodiments of the invention may be implemented on server 104. For example, embodiments may be implemented within messaging platform server software executing on server 104. Computing devices 106 may execute messaging platform client software or may execute a browser plugin for communicating with messaging platform server 104 via network 102.

Although FIG. 1 shows three computing devices 106, operating environment 100 may include fewer or additional computing devices 106. Similarly, although FIG. 1 shows only one server or server farm 104, operating environment 100 may include a number of servers or server farms 104.

Figure 2:
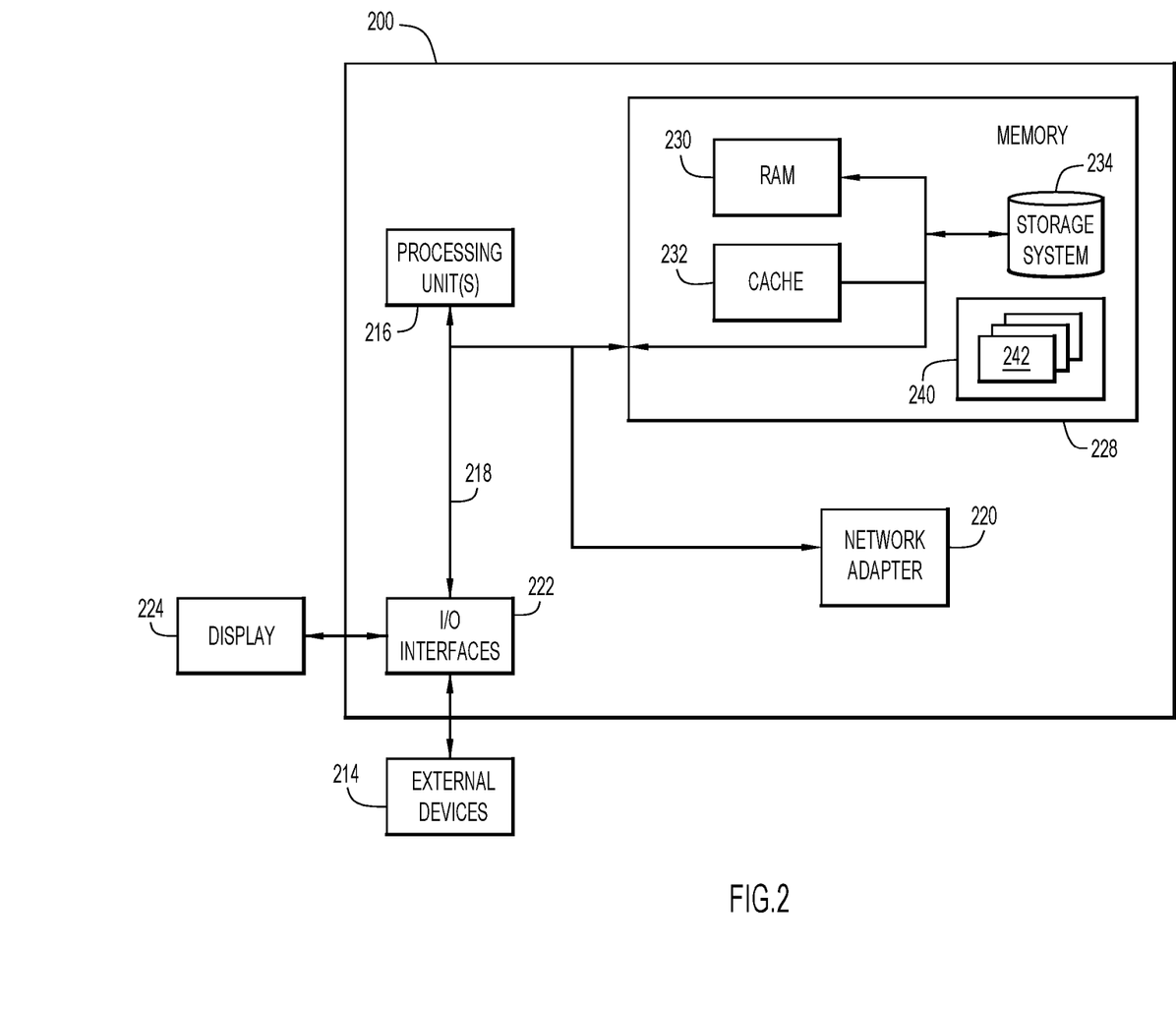
FIG. 2 is a block diagram of a computer system on which embodiments of the invention may be implemented according to embodiments of the invention.

Referring now to FIG. 2, a schematic of an example computer system 200 is shown, which may implement computing device 106 and server 104 in various embodiments. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices, such as a network card, modem, etc. that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

Figure 3:
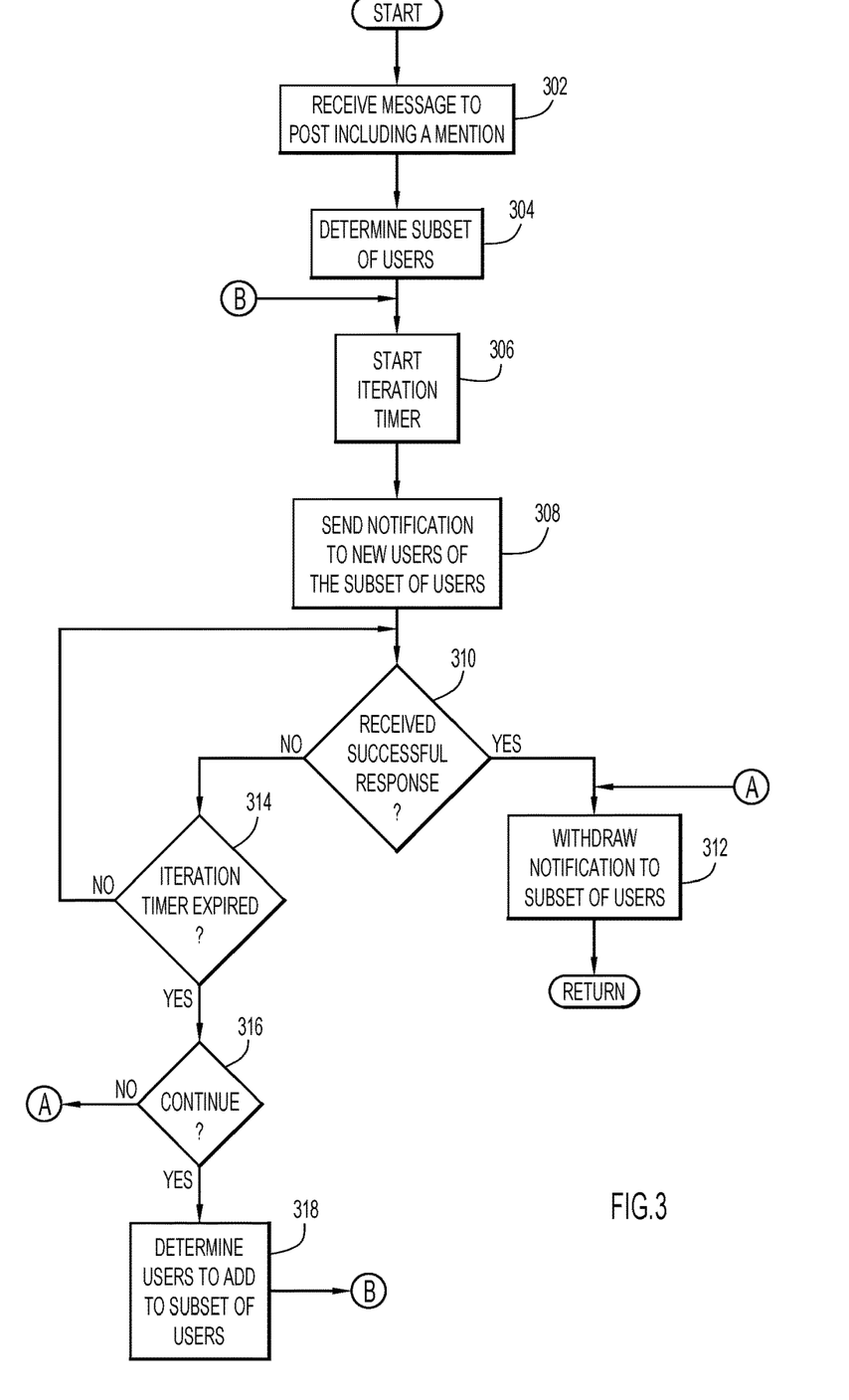
FIG. 3 is a flowchart that illustrates an example process according to embodiments of the invention.

FIG. 3 is a flowchart illustrating example processing in embodiments of the invention. The processing may be performed by server 104 executing the messaging platform server software. The process may begin with server 104 receiving a message to post from a user of a computing device 106 (act 302). The message includes a @any mention for users of a specific context such as, for example, a team, a group, a space, a channel, etc.

Next, server 104 may dynamically determine a subset of users of the specific context (act 304). The determined subset of users may be those users of the specific context of users that are most likely to respond to the posted message to resolve a question or an issue raised in the posted message. In various embodiments, the subset of the users may be determined based on one or more criteria. For example, one criteria may include a current activity of users in a space, channel, group or team, and a specific topic. For example, if the specific context is a team, then the subset of users may be a number of users of the team who are currently most active with respect to a specific topic of the posted message. The number of users may be ten users or another suitable number of users. A second criteria may include a level of activity, both past and present, of users in the specific context of users regarding messages having a same specific topic as the posted message. For example, if the specific context is a team, then the subset of users may be a number of users of the team who have had a highest level of past or present activity or both past and present activity regarding the specific topic of the posted message. A third criteria may include a level of past engagement with respect to notifications associated with other mentions having features similar to a current mention. For example, the subset of users may include a number of users having a highest level of past engagement regarding notifications associated with other mentions regarding a same specific topic as a current mention. A fourth criteria may include work schedules of respective users of the specific context of users. For example, the subset of users may be only those users whose current work schedule indicates they are currently working. A fifth criteria may include other time-related factors. For example, the subset of users may be those users whose local time is a time during which those users are most likely to be awake. A sixth criteria may include a social graph of a user who originated the mention. For example, the subset of users may be those users who are friends or 1st degree contacts of the user who originated the mention. A seventh criteria may include use of a machine learning model that learns a respective set of features associated with the messages to which each user of the specific context of users responds and the messages which the each user opens. For example, the subset of users may be those users who responded to or opened a highest number of messages having a set of features of the posted message. Other embodiments may include additional or other criteria for determining a subset of users of a specific context of users. For example, in an embodiment a user may manually specify a criteria such as a country or region where users are located, related topics in which users were active, etc. In one embodiment, manual criteria may be specified in user settings or a user profile. For example, a user may specify which topics he or she is likely to engage with via the user settings or the user profile.

In various embodiments, any number of methods may be used to determine a topic of a posted message or a group of posted messages.

Next, server 104 may start an iteration timer (act 306). The iteration timer may be set to expire after a fixed or variable amount of time has passed. In some embodiments, a time between iterations may be varied such that server 104 may determine best iteration time periods with respect to messages of specific topics. A notification associated with the received message may then be sent to computing devices 106 for delivery to the subset of users (act 308).

In some embodiments, the user who originated the @any may specify a due date for reaching a successful response. For example, in one embodiment, if the message is automatically or manually labeled as a question or a task to be done, the user may hover over the message with a pointing device, which may cause a selectable menu to be displayed that includes a menu item such as "assign due date." The user may select the menu item and be prompted to enter the due date, which may be associated with the message as metadata. Alternatively, the message may include text such as, for example, "I need an answer before my meeting at 4 today." Via natural language processing, the above text may be interpreted and the due date assigned.

If the due date is specified, in these embodiments, iteration time may be scaled with an objective of receiving a successful response by the due date. Server 104 may track a number of iterations needed to reach a successful conclusion. Using the tracked number of iterations, server 104 may determine how many iterations are expected for reaching a successful conclusion for a particular space, topic and channel and may determine a number of iterations which will achieve a successful result within a certain configurable threshold of certainty. Server 104 may scale iteration time such that the determined number of iterations will be made by the due date. The threshold may be determined based on a classification of urgency of a posted message or by other manners such as, for example, sentiment or urgency of the posted message. Other relevant characteristics of the posted message may be used to determine a definition for a class of mentions.

Server 104 may then determine whether a response was received, from one or more computing devices 106, that successfully answers a question or resolves an issue associated with the received message (act 310). This determination may be made as a result of the messaging platform determining that someone replied to the message, the originating user marking or labeling the message as answered or completed, or via other methods. If the response successfully answers the question or resolves the issue, then the notifications sent to the subset of users may be withdrawn (act 312) and the process may be completed.

If, during act 310, server 104 determines that the response does not successfully answer the question or resolve the issue associated with the received message, then server 104 may determine whether the iteration timer expired (act 314). If the iteration timer is determined to be unexpired, then server 104 may again determine whether a response was received that successfully answers the question or resolves the issue associated with the message.

If, during act 314, the iteration timer is determined to have expired, then server 104 may determine whether to continue with another iteration (act 316). In some embodiments, server 104 may determine not to continue with another iteration when a probability of receiving a response that resolves the question or resolves the issue associated with the message is less than a lower threshold value. For example, the lower threshold value may be 20%, 5% or another value. In some embodiments, the messaging platform may determine a value for the lower threshold based on trying different values and determining which value provides a best result. Server 104 may use statistics to determine a mean time to a successful resolution and a standard deviation for a time to a successful resolution to predict when a successful resolution is unlikely such as, for example, when the probability of a successful resolution is less than the lower threshold value. In other embodiments, server 104 may use a multi-featured analysis and a machine learning approach such as a linear or a logistic regression to determine whether a successful conclusion is likely after a current time. In this approach, server 104 may consider features that include, but are not limited to, a number of iterations of notifications, a topic of the posted message, a percentage of users of the specific context who have already received notifications, a current time of day, etc. For example, if a topic is "design," the messaging platform could narrow a scope of the mention to those users who typically engaged with messages related to "design" and met a number of other criteria such as availability, were likely working due to time of day, were most likely to respond based on a response rate so far, a number of iterations of notifications compared with a number of iterations of successfully resolved or unsuccessfully resolved mentions, etc.

In other embodiments, server 104 may determine not to continue with another iteration when a level of user engagement has reached a minimum threshold value, which may be 30%, 40% or another suitable value. The minimum threshold value may be determined by the messaging platform based on mentions that have been previously resolved successfully. In this specification, user engagement is defined as a percentage of users of a specific context of users who at least open a message associated with a notification.

If, during act 316, server 104 has made a determination to continue with another iteration, then additional users of the specific context may be determined for adding to the subset of users by server 104 (act 318) in a same manner as mentioned previously with respect to act 304 and acts 306-310 may again be performed.

If, during act 316, server 104 has made a determination to not continue with another iteration, then server 104 may withdraw the notifications previously sent to the subset of users (act 312) and the process may be completed.

In a variation of the embodiment, when a successful resolution to a question or issue associated with the message had not been received and, in act 316, a determination was made to not continue adding users of the specific context to the subset of users, then instead of withdrawing notifications to the subset of users during act 312, the process may simply hold, or pause, sending of additional notifications and may continue sending additional notifications to more users at a later point in time if the user who posted the original message decides to resume sending the notifications to the additional users. In some embodiments, the original user may select or "click on" a mention to resume sending the notifications to additional users.

In another variation, when the successful resolution to the question or the issue associated with the message had not been received and, in act 316, a determination was made to not continue adding users of the specific context to the subset of users, then instead of withdrawing notifications to the subset of users during act 312, server 104 may pursue strategies for engagement outside of the specific context of users. For example, server 104 may ask the user who posted the original message whether notifications should be sent to users in other spaces, groups, channels, etc. If the user indicates that the notifications should be sent to the users in the other spaces, groups, channels, etc., then server 104 may automatically select a subset of users from the other spaces, groups, channels, etc. Alternatively, the user may provide one or more of the other spaces, groups, channels, etc. from which a subset of users may be selected to which notifications may be sent.

In yet another variation, after determining that a successful response was not received that successfully resolves or answers the mention, at act 310, a determination may be made regarding whether all or a certain proportion of users who have received the notification in an iteration and have had an opportunity to interact with the notification, but have not done so, or have done so without successfully resolving or responding to the notification. If this is the case, then the process would continue to act 316 to check whether to continue sending mentions, as previously described, but without waiting for the iteration timer to expire. Otherwise, a determination may be made regarding whether the iteration timer has expired, as previously described with respect to act 314. Further, in this variation, having an opportunity to interact with the notification may include seeing the notification, opening the notification, or taking other actions. In addition, other factors may be taken into account such as, for example, a user's work schedule, time zone, etc. For example, if a user sees the notification during a time at which the user is available, as indicated by the user's work schedule, this may be considered an opportunity to interact. However, if the user sees the notification at a time during which the user's work schedule indicates that the user is not available, then this may not be considered an opportunity to interact.

A variation of @any, which more aggressively pursues a strategy to get at least one user deeply engaged in a conversation associated with a posted message is @urgent. In other embodiments, this variation may have other names such as, for example, @urgent@any, @urgent_any, @any-now, etc. An @urgent type notification may be implemented in some embodiments, by selecting a larger number of users of a specific context, as compared to an @any type mention, to be added to a subset of users at each iteration and sending the notifications to the newly added users of the subset of users. The criteria for selecting users to add to the specific context may otherwise be the same as mentioned previously with respect to act 304. Other embodiments may set lower threshold values, as compared with the @any type mention, during act 316 such that notifications may be sent to newly added users of the subset of users for a greater number of iterations as compared with the @any type mention. In further embodiments, users outside of the specific context as well as users within the specific context may be added to the subset of users during at least some of the iterations. Other aggressive strategies may be implemented in yet other embodiments.

The environment of the present invention embodiments may include any number of computer or other processing systems, such as client or end-user systems, server systems, etc., and databases or other repositories arranged in any desired fashion, where the present invention embodiments may be applied to any desired type of computing environment, such as cloud computing, client-server, network computing, mainframe, etc. The computer or other processing systems employed by the present invention embodiments may be implemented by any number of any personal or other type of computer or processing system, such as a desktop, laptop, PDA, mobile devices, etc., and may include any commercially available operating system and any combination of commercially available and custom software, such as browser software, communications software, server software, etc. These systems may include any types of monitors and input devices, such as a keyboard, mouse, voice recognition, etc., to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium, such as a LAN, WAN, Intranet, Internet, hardwire, modem connection, wireless, etc. For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium, such as magnetic or optical media, magneto-optic media, floppy diskettes, CD-ROM, DVD, memory devices, etc., of a stationary or portable program product apparatus or device for use with systems connected by a network or other communications medium.

The communication network may be implemented by any number of any type of communications network, such as LAN, WAN, Internet, Intranet, VPN, etc. The computer or other processing systems of the present invention embodiments may include any conventional or other communications devices to communicate over the network via any conventional or other protocols. The computer or other processing systems may utilize any type of connection, such as wired, wireless, etc., for access to the network. Local communication media may be implemented by any suitable communication media, such as local area network (LAN), hardwire, wireless link, Intranet, etc.

The system may employ any number of any conventional or other databases, data stores or storage structures, such as files, databases, data structures, data or other repositories, etc., to store information. The database system may be implemented by any number of any conventional or other databases, data stores or storage structures, such as files, databases, data structures, data or other repositories, etc., to store information. The database system may be included within or coupled to the server and/or client systems. The database systems and/or storage structures may be remote from or local to the computer or other processing systems, and may store any desired data.

The present invention embodiments may employ any number of any type of user interface, such as Graphical User Interface (GUI), command-line, prompt, etc., for obtaining or providing information, where the interface may include any information arranged in any fashion. The interface may include any number of any types of input or actuation mechanisms, such as buttons, icons, fields, boxes, links, etc., disposed at any locations to enter/display information and initiate desired actions via any suitable input devices (e.g., mouse, keyboard, etc.). The interface screens may include any suitable actuators, such as links, tabs, etc., to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for delivering notifications to users of a messaging platform, the method comprising:
   receiving, by a server, a mention from a user of a messaging platform, the mention being directed to a specific context of users;
   dynamically determining, by the server, a subset of users from the specific context of users such that each user of the subset of users is more likely to engage with a notification associated with the mention than users of the specific context outside of the subset of users;
   sending, by the server, the notification associated with the mention to only the subset of users from the specific context of users; and
   responsive to expiration of an iteration timer prior to receiving a response to the notification:
      determining that a probability of receiving the response is at least a lower threshold value,
      starting the iteration timer by the server,
      determining one or more additional users to add to the subset of users, and
      sending, by the server, the notification to the one or more additional users of the subset of users.

2. The method of claim 1, further comprising:
   responsive to determining that the probability of receiving the response is less than the lower threshold value:
      ceasing the sending of the notification to any of the additional users,
      receiving a command from the user of the messaging platform to resume the sending of the notification, and
      performing, in response to receiving the command:
         dynamically determining a subset of users outside of the specific context of users, and
         sending the notification associated with the mention to the subset of users outside of the specific context of users.

3. The method of claim 1, further comprising:
   iteratively removing at least one user from the subset of users based on user engagement associated with the mention; and
   withdrawing the notification with respect to the at least one user from the subset of users upon removal of the at least one user from the subset of users.

4. The method of claim 1, wherein the dynamically determining the subset of users is based on at least one from a group of:
a current activity in one from a first group of a space, a channel, and a specific topic,
a level of activity with respect to the one from the first group,
a level of past engagement with notifications associated with other mentions having similar features,
work schedules of respective users,
time related factors, and
a social graph of the user who provided the mention.

5. The method of claim 1, wherein the dynamically determining the subset of users is based on a machine learning model that learns a respective set of features associated with messages to which each user responds and the messages which the each user opens.

6. The method of claim 1, further comprising:
sending the notification to users outside of the specific context of users when the probability of receiving the response is less than the lower threshold value.

7. A computer system for delivering notifications to users of a messaging platform, the computer system comprising:
at least one processor; and
a memory connected with the at least one processor, wherein the memory includes instructions to configure the at least one processor to perform:
receiving a mention from a user of a messaging platform, the mention being directed to a specific context of users;
dynamically determining a subset of users from the specific context of users such that each user of the subset of users is more likely to engage with a notification associated with the mention than users of the specific context of users outside of the subset of users;
sending the notification associated with the mention to only the subset of users from the specific context of users; and
responsive to expiration of an iteration timer prior to receiving a response to the notification:
determining that a probability of receiving the response is at least a lower threshold value,
starting the iteration timer,
determining one or more additional users to add to the subset of users, and
sending the notification to the one or more additional users of the subset of users.

8. The computer system of claim 7, wherein the at least one processor is further configured to perform:
responsive to determining that the probability of receiving the response is less than the lower threshold value:
ceasing the sending of the notification to any of the additional users,
receiving a command from the user of the messaging platform to resume the sending of the notification, and
performing, in response to receiving the command:
iteratively adding to the subset of users from the specific context of users, and
sending the notification associated with the mention to newly added users of the subset of users of the specific context of users.

9. The computer system of claim 7, wherein the at least one processor is further configured to perform:
iteratively removing at least one user from the subset of users based on user engagement associated with the mention; and
withdrawing the notification with respect to the at least one user from the subset of users upon removal of the at least one user from the subset of users.

10. The computer system of claim 7, wherein the dynamically determining the subset of users is based on at least one from a group of:
a current activity in one from a first group of a space, a channel, and a specific topic,
a level of activity with respect to the one from the first group,
a level of past engagement with notifications associated with other mentions having similar features,
work schedules of respective users,
time related factors,
a social graph of the user who provided the mention, and
a machine learning model that learns a respective set of features associated with messages to which each user responds and the messages which the each user opens.

11. The computer system of claim 7, further comprising:
ceasing sending of the notification to any of the additional users when the predicted probability is less than the lower threshold value.

12. A computer program product comprising at least one computer readable storage medium having computer readable program code embodied therewith for execution on at least one processor of a computer device, the computer readable program code being configured to be executed by the at least one processor to perform:
receiving a mention from a user of a messaging platform, the mention being directed to a specific context of users;
dynamically determining a subset of users from the specific context of users such that each user of the subset of users is more likely to engage with a notification associated with the mention than users of the specific context of users outside of the subset of users;
sending the notification associated with the mention to only the subset of users from the specific context of users; and
responsive to expiration of an iteration timer prior to receiving a response to the notification:
determining that a probability of receiving the response is at least a lower threshold value,
starting the iteration timer,
determining one or more additional users to add to the subset of users, and
sending the notification to the one or more additional users of the subset of users.

13. The computer program product of claim 12, wherein the computer readable program code is further configured to be executed by the at least one processor to perform:
responsive to determining that the probability of receiving the response is less than the lower threshold value:
ceasing the sending of the notification to any of the additional users.

14. The computer program product of claim 13, wherein the computer readable program code is further configured to be executed by the at least one processor to perform:
receiving a command from the user of the messaging platform to resume the sending of the notification, and
performing, in response to receiving the command:
dynamically determining a subset of users outside of the specific context of users, and sending the notification associated with the mention to the subset of users outside of the specific context of users.

15. The computer program product of claim 12, wherein the computer readable program code is further configured to be executed by the at least one processor to perform:
    ceasing the sending of the notification to any of the additional users when a level of engagement of the subset of users reaches a threshold value; and
    withdrawing the notification with respect to the subset of users upon the ceasing of the sending of the notification to the any of the additional users.

16. The computer program product of claim 12, wherein the dynamically determining the subset of users is based on at least one from a group of:
    a current activity in one from a first group of a space, a channel, and a specific topic,
    a level of activity with respect to the one from the first group,
    a level of past engagement with notifications associated with other mentions having similar features,
    work schedules of respective users,
    time related factors,
    a social graph of the user who provided the mention, and
    a machine learning model that learns a respective set of features associated with messages to which each user responds and messages which the each user opens.

17. The computer program product of claim 12, wherein:
    the received mention includes a due date; and
    the computer readable program code is further configured to be executed by the at least one processor to perform:
    scaling an iteration time with an objective of receiving the response to the notification by the due date.

* * * * *